(12) United States Patent
Capobianco

(10) Patent No.: US 10,469,886 B2
(45) Date of Patent: Nov. 5, 2019

(54) SYSTEM AND METHODS OF SYNCHRONIZING PROGRAM REPRODUCTION ON MULTIPLE GEOGRAPHICALLY REMOTE DISPLAY SYSTEMS

(71) Applicant: TOK.tv Inc., Palo Alto, CA (US)

(72) Inventor: Fabrizio Capobianco, Redwood City, CA (US)

(73) Assignee: Minerva Networks, Inc., San Jose, CA (US)

( * ) Notice: Subject to any disclaimer, the term of this patent is extended or adjusted under 35 U.S.C. 154(b) by 28 days.

(21) Appl. No.: 13/857,994

(22) Filed: Apr. 6, 2013

(65) Prior Publication Data

US 2016/0249081 A1    Aug. 25, 2016

Related U.S. Application Data

(60) Provisional application No. 61/621,462, filed on Apr. 6, 2012, provisional application No. 61/621,464, filed on Apr. 6, 2012.

(51) Int. Cl.
| | |
|---|---|
| *H04N 21/242* | (2011.01) |
| *H04N 21/43* | (2011.01) |
| *H04N 21/41* | (2011.01) |
| *H04N 21/443* | (2011.01) |

(52) U.S. Cl.
CPC ....... *H04N 21/242* (2013.01); *H04N 21/4302* (2013.01); *H04N 21/4122* (2013.01); *H04N 21/4431* (2013.01)

(58) Field of Classification Search
CPC ............. H04N 21/242; H04N 21/4122; H04N 21/4302

USPC ........................................................ 725/116
See application file for complete search history.

(56) References Cited

U.S. PATENT DOCUMENTS

| | | | |
|---|---|---|---|
| 8,869,222 B2 | 10/2014 | Winograd et al. | |
| 9,510,044 B1 | 11/2016 | Pereira et al. | |
| 10,321,192 B2 | 6/2019 | Zaccone et al. | |
| 2002/0136335 A1* | 9/2002 | Liou .................... | H04J 3/0667 |
| | | | 375/354 |
| 2005/0149988 A1 | 7/2005 | Grannan | |
| 2006/0156375 A1* | 7/2006 | Konetski ................. | H04N 5/76 |
| | | | 725/135 |
| 2006/0236352 A1 | 10/2006 | Scott | |

(Continued)

FOREIGN PATENT DOCUMENTS

| | | | | |
|---|---|---|---|---|
| WO | WO2013029263 A1 | 3/2013 | | |
| WO | WO 2013079993 A1 * | 6/2013 | ............. | H04R 29/00 |
| WO | WO 2013144681 A1 * | 10/2013 | ............. | H04S 3/004 |

*Primary Examiner* — Nasser M Goodarzi
*Assistant Examiner* — Jaycee Imperial
(74) *Attorney, Agent, or Firm* — Carr & Ferrell LLP

(57) ABSTRACT

A system controller, preferably implemented as a cloud service, enables the synchronization of display devices located at geographically remote locations relative to one another. A display and control devices are provided at each of a plurality of sites, with one or both of the devices being capable displaying the transmitted show. The control device enables the system controller to determine local relative delays in the show and to control the temporal reproduction of said transmitted show by said display device so as to achieve a substantially synchronized reproduction of the show at each of the sites.

8 Claims, 1 Drawing Sheet

(56) References Cited

U.S. PATENT DOCUMENTS

| | | |
|---|---|---|
| 2006/0244818 A1 | 11/2006 | Majors et al. |
| 2008/0177557 A1 | 7/2008 | Saul |
| 2009/0119780 A1 | 5/2009 | Ham |
| 2010/0083324 A1 | 4/2010 | Smith et al. |
| 2010/0119208 A1 | 5/2010 | Davis et al. |
| 2010/0235466 A1 | 9/2010 | Jung et al. |
| 2011/0063503 A1 | 3/2011 | Brand et al. |
| 2011/0099616 A1 | 4/2011 | Mazur et al. |
| 2011/0145881 A1 | 6/2011 | Hartman et al. |
| 2011/0246908 A1 | 10/2011 | Akram et al. |
| 2011/0247031 A1 | 10/2011 | Jacoby |
| 2011/0283203 A1* | 11/2011 | Periyannan ............ H04N 7/141 715/753 |
| 2012/0098920 A1 | 4/2012 | Pennington et al. |
| 2012/0159348 A1 | 6/2012 | Stroomer et al. |
| 2012/0210379 A1 | 8/2012 | McCoy et al. |
| 2012/0331476 A1 | 12/2012 | Saffre |
| 2013/0076980 A1* | 3/2013 | Oren ........................ H04N 5/04 348/500 |
| 2013/0091284 A1* | 4/2013 | Rothschild .............. G06F 3/067 709/226 |
| 2013/0093648 A1 | 4/2013 | Im et al. |
| 2013/0173710 A1 | 7/2013 | Seo |
| 2013/0222638 A1 | 8/2013 | Wheeler et al. |
| 2013/0251329 A1* | 9/2013 | McCoy ................ H04N 21/654 386/201 |
| 2013/0290502 A1 | 10/2013 | Bilobrov et al. |
| 2013/0308818 A1 | 11/2013 | MacIntosh et al. |
| 2014/0071344 A1 | 3/2014 | Francisco |
| 2014/0189042 A1 | 7/2014 | Chen et al. |
| 2015/0089051 A1* | 3/2015 | Ojanpera ................ H04S 3/004 709/224 |
| 2015/0146874 A1* | 5/2015 | Ojanpera ................ H04R 29/00 381/56 |
| 2016/0192010 A1 | 6/2016 | Zaccone et al. |
| 2017/0150223 A9 | 5/2017 | Zaccone et al. |
| 2017/0257652 A1 | 9/2017 | Capobianco et al. |

* cited by examiner

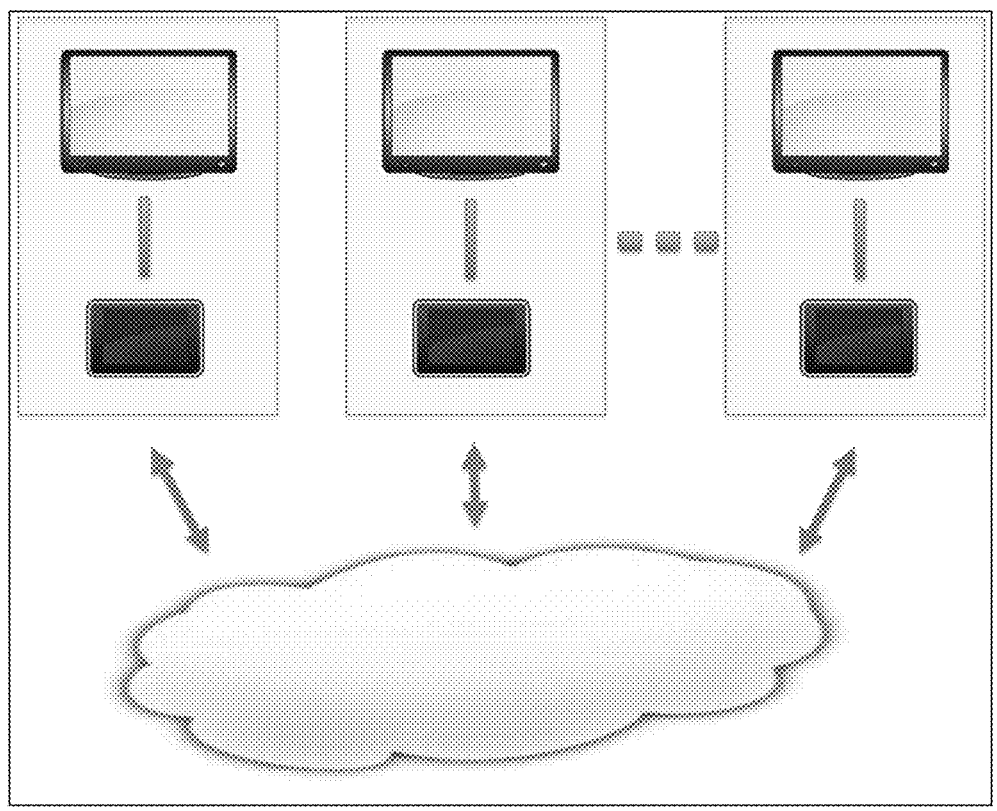

SYSTEM AND METHODS OF SYNCHRONIZING PROGRAM REPRODUCTION ON MULTIPLE GEOGRAPHICALLY REMOTE DISPLAY SYSTEMS

This application claims the benefit of U.S. Provisional Application Nos. 61/621,462 and 61/621,464, all filed Apr. 6, 2012.

BACKGROUND OF THE INVENTION

Field of the Invention

The present invention is generally related to the remote distribution and playback of television programs and, in particular, to mechanisms for synchronizing playback on display devices that are geographically remote from one another.

Description of the Related Art

The world of television is about to change. For 70 years, the television box has been completely disconnected from the rest of the household. With the advent of wireless networks, connected set-top-box and tablets, our old television is now about to be integrated in our daily life.

For example, we can watch a movie and check information about that actor on an iPad sitting on our laps. The so-called "second screen" can augment the vision of the show we are watching, allowing us to enjoy it even more.

Watching a show on television with an iPad connected to the world allows for a completely new scenario, where television can become (or return to being) social. We all get together for a great game, to watch it with friends in front of the television. However, in most cases we are unable or unwilling to travel, but we still would love to chat about a show with our friends, live, while the show is on television. With the support of a second-screen device, this is finally possible: we can communicate with all the people watching the same show we are watching, just because they have an iPad on their laps too.

The opportunity is incredible, because making television social means changing the way we watch television. Once you give a user this capability, there is no turning back. There is nothing more depressing than watching television alone. Once you are able to share the experience with friends—even if they are far away—you will never go back: watching television alone is going to be a thing of the past.

This scenario opens up a new opportunity for advertisers, who are investing $200B every year to show commercials on a box, without knowing if the consumer is actually watching the show, or what she likes, or giving her any ability to interact with the ad. With a second screen, the advertiser will be able to target the user and deliver ads that become interactive, not on the television, but on the second screen: I see a commercial about a tennis shoe on television, and I have the ability to buy it on the tablet. This is the holy grail of advertising.

There is one major issue to deliver such a new experience, and it is due to the fact that shows are not synchronized across televisions. Because of difference in terrestrial broadcasting vs. cable broadcasting vs. satellite broadcasting the show I am watching on my television might be a few seconds late, compared on the one you are watching on your television. Delays are also added by digital compression for High-Definition or by set-top-boxes.

Watching an out-of-sync show while talking with your friends could completely kill the experience. If we are watching a game and one of the users is "ahead" of the others by a few seconds, she will know the result of any action in advance, thus ruining the pleasure of the game to everyone else.

SUMMARY OF THE INVENTION

Thus, a general purpose of the present invention is to provide an effective mechanism for synchronizing the reproduction of a program on multiple display devices, such as television systems, that are geographically remote from one another.

This is achieved in the present invention by providing a system controller, preferably implemented as a cloud service, enables the synchronization of display devices located at geographically remote locations relative to one another. A display and control devices are provided at each of a plurality of sites, with one or both of the devices being capable displaying the transmitted show. The control device enables the system controller to determine local relative delays in the show and to control the temporal reproduction of said transmitted show by said display device so as to achieve a substantially synchronized reproduction of the show at each of the sites.

An advantage of the present invention is that the reproduction of the program is substantially synchronized between the several participating remote display locations.

BRIEF DESCRIPTION OF THE DRAWINGS

FIG. 1 is a general block diagram illustrating a preferred embodiment of the present invention.

DETAILED DESCRIPTION OF THE INVENTION

The present invention provides a system and methods of substantially synchronizing the reproduction of a program on mutually geographically remote display devices, including in particular, television systems. In the following detailed description of the invention like reference numerals are used to designate like parts depicted in one or more of the figures.

The exemplary scenario for an implementation of a preferred embodiment of the present invention involves two principal actors at each site:

1) a television display system in the general viewing vicinity of one or more viewers; and
2) an auxiliary-screen, such as a mobile device or tablet device, typically held or in close reach of the television viewer(s) and that is suitable for establishing or supporting a conversation, or chat session, between the several remote sites.

A third actor that is shared virtually between the several remote sites is a cloud service implemented in accordance with a preferred embodiment of the present invention. The cloud service controls the interaction between the participants in the chat. This preferred embodiment is depicted FIG. 1.

The scenario might also include a set-top-box, which is a device attached to the television set, which could interact directly to the second screen. This scenario is quite common, in particular with older not-connected television sets: the set-top-box is the device connected to the network, delivering the content to the television set based on instructions coming from the second screen.

An alternate embodiment may dispense with the second screen device, where the application is installed directly on the television set or on the set-top-box. In this case, the cloud service would be interacting directly with the television set or the set-top-box.

There are two principal steps necessary to solve the delay issue:
1) Understanding the delay between the various televisions, in order to know which television is ahead of which and by how many milliseconds; and
2) Fixing the delay, synchronizing all the televisions to show the same picture at the same time.

In accordance with the present invention, any of several methods may be used to understand the delay between the various television sets. These methods include:
1) audio fingerprinting;
2) video fingerprinting; and
3) using defined application-program interfaces (APIs) offered by the manufacturers or integrators of set-top-boxes or connected televisions.

A possible fourth method will include some combination of some of the methods above, depending on the capabilities of the devices used by the viewers/users.

The audio fingerprinting method assumes the ability of the second screen device to listen to the audio coming from the television. Starting from a command coming from the cloud service, to which all the second screens are connected (triggered by the user or automatically by the system), all the second screens will record a few seconds of audio of the show that is being presented on television. The second screens will then send the audio segment to the cloud service, which will confront the segments and compute the delay of every segment compared to the others. The algorithm will use fingerprinting technologies to align the various segments and derive the order of those.

The cloud service might already have the full recording of the show, or be recording it live. This would allow a more precise analysis of the delays, for example to determine if one of the televisions is actually tuned on a different show. The result of the computation, in a case where three viewer/users are watching a single show (User1, User2, User3) might be as follows:
  User1: delay of 500 milliseconds
  User2: delay of 0 milliseconds (the user "ahead" of everyone else)
  User3: delay of 4500 milliseconds (the user with the largest delay, or "last")

The video fingerprinting method assumes the ability of the second screen device to record the video on the television, through, for example, an external camera. Starting from a command coming from the cloud service, to which all the second screens are connected (triggered by the user or automatically by the system), the users will be alerted to point the camera of the device towards the television.

The second screens will record a few seconds of video of the show that is being presented on television. The second screens will then send the video segment to the cloud service, which will compare the segments and compute the delay of every segment relative to the others. The algorithm will use fingerprinting technologies to align the various segments and derive the order of those.

Again, the cloud service might already have the full recording of the show, or be recording it live. This would allow a more precise analysis of the delays, for example to determine if one of the televisions is actually tuned on a different show. The result of the computation, in a case where three users are watching a single show (User1, User2, User3) might be as follows:
  User1: delay of 500 milliseconds
  User2: delay of 0 milliseconds (the user "ahead" of everyone else)
  User3: delay of 4500 milliseconds (the user with the largest delay, or "last")

Where some or all of the televisions and/or set-top-boxes provide an API available on the network of the second screen, by establishing an appropriate channel of communications through the second screen or possibly directly, the cloud service can access the television or set-top-box to obtain a timestamp reflecting the local time of reproduction of the program. Starting from a command coming from the cloud service, to which all the second screens are connected (triggered by the user or automatically by the system), all the second screens will query their televisions (or set-top-boxes) and retrieve the timestamp of the show. The timestamps will then be sent to the cloud service to be analyzed. For example, in case of three users watching a single show (User1, User2, User3) the analysis may show:
  User1: timestamp of 1,500 milliseconds from the beginning of the show
  User2: timestamp of 1,000 milliseconds from the beginning of the show
  User3: timestamp of 5,500 milliseconds from the beginning of the show The cloud service will then compute the delay, comparing the timestamps, thus arriving at the following conclusion in this example:
  User1: delay of 500 milliseconds
  User2: delay of 0 milliseconds (the user "ahead" of everyone else)
  User3: delay of 4500 milliseconds (the user with the largest delay, or "last")

A final method as potentially used in a preferred embodiment of the present invention involves the use of some combination of the three methods explained above. This method could be useful in situations where some of the second screen devices are not capable of recording audio from the television sets, or some of the devices are not capable of recording video from the television sets, or some of the television sets are not capable of providing a timestamp.

In such case, a combination of timestamp and audio/video fingerprinting will be performed at the cloud service level, to extract the delay—as in the three methods described before.

To correct for the delay as however identified above, the cloud service will operate to temporarily pause the television sets which are ahead of the others, to align the program to the television set which is "last". This method assumes that the television sets can be paused, due to the availability of a pause button on the remote control, device or set-top-box, via user intervention or API. The cloud service will send to each second screen device a command to pause for the amount of time necessary to align all television sets to the "last" user. Thus, for example:
  User1 is 4,000 milliseconds ahead of User 3
  User2 is 4,500 milliseconds ahead of User 3
  User3 is the "last" user Therefore, the cloud service will instruct the second screen of User1 to pause the television for 4 seconds and the second screen of User2 to pause the television for 4.5 seconds. At the end of the operation, all televisions will be in sync. The success of the operation can be verified by re-doing the delay analysis explained before: after a sync is performed, all the televisions should have delay substantially equal to zero.

The second screen could manage to pause the television sets (or set-top-boxes) in two ways: via an API call to the television set (or set-top-box); or by visualizing a message on screen to instruct the user to manually pause the television set for a determined amount of time (for example, visualizing a countdown).

Once a synchronization of all the devices is completed, there is still the possibility that—during the show—the television sets will get "out-of-sync". For example, one or more of the sites may be receiving the program from an independent source, thus leading to the possibility of drift. This scenario forces a re-sync of the devices, to make sure all the shows are aligned.

A re-synchronization is preferably triggered by a scheduled check by the cloud service, based on a time interval which will be computed by the cloud synchronizer (the time between checks will be doubled compared to the previous check, if at the previous check the televisions remain in sync, and reset to the minimum after a check which shows that the televisions are not in sync. Alternately, or in addition, a user may issue a synchronization check command, if user realizes or suspects that the show they are watching is out of sync with the one the other users are watching. The check to understand if the different television sets are still in sync or not is going to be performed using one of the methods described above. Ideally the check will be completely transparent for the users, therefore preferably excluding the video fingerprinting option.

Once the televisions are in sync, one of the users (the "owner of the living room" or host: the user who may have invited all the other users to watch the show) will be able to control the television sets of all the other users. In a preferred embodiment of the present invention, the host may at any time pause the show locally with the effect that the show on the other television sets is paused as well. The host may also, at any time, forward or rewind the show, the show on the other television sets are forwarded or rewound as well. When the host plays the show again, the show starts again on the other television sets.

In an alternate embodiment of the present invention, a user at any site may act as the host and operate the other televisions in concert with their local television set.

Preferably, the method used to remotely command the other television set makes a similar use of the television and set-top-box APIs. This scenario assumes the capability of all of the televisions (or set-top-boxes) to provide an API available on the network of the second screen, providing the ability for a device to pause, play, forward or rewind the television.

The second screen of the host, after the host acts on the device to pause/rewind/forward/play the show, will communicate to the cloud service, which will issue the same command to the other devices. Because of network delays, there is the possibility that the television sets will get out-of-sync during the procedure. To solve this problem, after every command the procedure to synchronize all the televisions is preferably triggered (using the set-top-box APIs).

Thus, a system and methods for synchronizing the control and playback of a show to multiple, geographically remote display devices has been described.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A system providing for the synchronization of display devices located at geographically remote locations relative to one another, said system comprising:
   a) a display device at each respective one of a plurality of sites, said display device receiving and displaying a transmitted show;
   b) a control device at each respective one of said plurality of sites, said control device comprising a processor executing instructions stored in memory, the instructions comprising controlling temporal reproduction of said transmitted show by said display device;
   c) a plurality of cloud servers providing a cloud service; the cloud service operative to interact with said control devices to ascertain a local relative synchronization delay of said transmitted show at each of said plurality of sites, said cloud service being further operative to adjust the temporal reproduction of said transmitted show by said display devices to achieve a substantially synchronized reproduction of said transmitted show at each of said plurality of sites by scheduled checks based on a computed time interval with the computed time interval between the scheduled checks being doubled compared to a previous check if at the previous check the transmitted show is synchronized on each of the display devices at each of the plurality of sites and the scheduled checks being set to a minimum if at the previous check the transmitted show is not synchronized on each of the display devices at each of the plurality of sites; and
   d) an auxiliary screen at each respective one of said plurality of sites, said auxiliary screen receiving a command from said cloud service that in response records a few seconds of audio from said transmitted show and transmits said few seconds of audio to said cloud service that in response computes a delay of said transmitted show compared to display devices at other geographically remote locations; and wherein a single party at one of the plurality of the sites controls the display devices at all of the plurality of the sites.

2. The system of claim 1, further comprising said auxiliary screen at each respective one of said plurality of sites receiving a command from said cloud service that in response records a few seconds of video from said transmitted show and transmits said few seconds of video to said cloud service that in response computes a delay of said transmitted show compared to display devices at other geographically remote locations.

3. The system of claim 1, further comprising said auxiliary screen at each respective one of said plurality of sites receiving a command from said cloud service that in response retrieves a timestamp from said transmitted show and transmits said timestamp to said cloud service that in response computes a delay of said transmitted show compared to display devices at other geographically remote locations.

4. The system of claim 1, further comprising said cloud service computing a delay of said transmitted show based on a video segment, an audio segment and a timestamp.

5. The system of claim 1, further comprising said cloud service temporarily pausing said display device at each respective one of the plurality of sites that are displaying said transmitted show ahead of display devices at other geographically remote locations.

6. The system of claim 5, further comprising said cloud service restarting said paused display device to align said transmitted show to be simultaneous with a sequence of said transmitted show as displayed by a slowest display device in the plurality of sites.

7. The system of claim 6, further comprising said cloud service pausing and restarting said display device at each respective one of the plurality of sites that are displaying said transmitted show ahead of display devices at other geographically remote locations by way of transmitting instructions to each respective said auxiliary screen.

8. The system of claim 7, further comprising said auxiliary screen at each respective one of said plurality of sites facilitating a chat session with other auxiliary screens in said plurality of sites.

\* \* \* \* \*